United States Patent
Fan et al.

(10) Patent No.: US 8,441,684 B2
(45) Date of Patent: May 14, 2013

(54) BETWEEN-SEGMENT DISCONTINUITY REDUCTION FOR TEXT VECTORIZATION USING DOMINANT POINT CLASSIFICATION

(75) Inventors: Zhigang Fan, Webster, NY (US); Francis Kapo Tse, Rochester, NY (US); Bingfeng Zhou, Beijing (CN); Yadong Mu, Beijing (CN); He Tao, Beijing (CN)

(73) Assignee: Xerox Corporation, Norwalk, CT (US)

( * ) Notice: Subject to any disclaimer, the term of this patent is extended or adjusted under 35 U.S.C. 154(b) by 980 days.

(21) Appl. No.: 12/498,387

(22) Filed: Jul. 7, 2009

(65) Prior Publication Data

US 2011/0007334 A1 Jan. 13, 2011

(51) Int. Cl.
*H04N 1/387* (2006.01)
*G06K 15/00* (2006.01)
*G06K 9/34* (2006.01)

(52) U.S. Cl.
USPC ............ 358/2.1; 358/1.11; 358/462; 382/176

(58) Field of Classification Search .................. None
See application file for complete search history.

(56) References Cited

U.S. PATENT DOCUMENTS

2009/0148042 A1* 6/2009 Fan et al. ............... 382/176

OTHER PUBLICATIONS

Teh, et al., "A Scale-Independent Dominant Point Detection Algorithm," IEEE International Conference on CVPR, Jun. 5-9, 1988, Ann Arbor, Michigan, pp. 229-234.
Teh, et al., "On the Detection of Dominant Points on Digital Curves," IEEE Transactions on Pattern Analysis and Machine Intelligence, vol. 11, No. 8, Aug. 1989, pp. 859-872.
Fan, et al., "Text Vectorization Using OCR and Stroke Structure Modeling," U.S. Appl. No. 12/332,913, filed Dec. 11, 2008.

* cited by examiner

*Primary Examiner* — Vincent Rudolph
(74) *Attorney, Agent, or Firm* — Philip E. Blair; Fleit Gibbons Gutman Bongini & Bianco P.L.

(57) ABSTRACT

What is disclosed is a novel system and method for text vectorization for bitmap images with reduced artificial discontinuities. Dominant points are identified in a bitmap character image. An initial curve is fitted to edge points of the character image in a vicinity of a selected dominant point. A set of boundary parameters in a vicinity of the selected dominant point are estimated based upon the initial curve. The selected dominant point is then classified as one of a sharp dominant point and a smooth dominant point based upon the boundary parameters or alternatively upon predefined classifications produced by an optical character recognition process. Curves are fitted between the selected dominant point and adjacent dominant points. The fitted curves maintain the estimated boundary parameters in the vicinity of smooth dominant points. A vectorized representation of the text character image based upon the fitted curves is produced as output.

14 Claims, 4 Drawing Sheets

BETWEEN-SEGMENT DISCONTINUITY REDUCTION FOR TEXT VECTORIZATION USING DOMINANT POINT CLASSIFICATION

TECHNICAL FIELD

The present invention is directed to systems and methods for vectorizing bitmap images of text characters of a scanned document in a document image processing system.

BACKGROUND

Text characters are able to be represented in bitmap or in vector form. In a vector representation, an outline of the character is specified by a set of curves. Vector representations have an advantage of being independent of display or printer resolution. Vector representation of characters is practical for electronically created documents, but they are often not natively available for scanned documents. Scanning of documents generally produce bitmap data for the entire page, including the individual characters present therein. Vectorization of text characters generally results in several advantages. These advantages include, for example, smooth text instead of jagged and bumpy bitmaps; better image quality for scaling and/or printing on different output resolution devices, particularly multi-functional devices and mobile devices; and the shape of the text can be edited with standard graphic tools to enable easy modification of font attributes in order to reformat the text for different purposes or displays.

In text vectorization, dominant points which separate segments of the outline of the bitmap character are often first determined. While most of the dominant points occur at corners and sharp transitions, some dominant points partition smooth curves within the bitmap characters. In a case of a dominant point partitioning a smooth curve within the bitmap character, improved vectorization can be realized if the smooth curve remains smooth in its vector representation. However, vectorization may introduce artificial discontinuities within smooth curves of a character. This occurs both in traditional and OCR-based processing methods for bitmap characters. For instance, sharp edges can be introduced into smooth curves that are partitioned by a dominant point because adjacent segments are coded independently from each other.

Accordingly, what is needed in this art are increasingly sophisticated systems and methods for vectorizing bitmap images of text characters of scanned documents to reduce artificial discontinuities between neighboring segments such that curved edges of the character retain a desired smoothness.

BRIEF SUMMARY

What is disclosed is a novel system and method for text vectorization with reduced artificial discontinuities for a bitmap image of a scanned document. Dominant points of a bitmap character are determined and curves are fitted to the character segments between the dominant points. In the data fitting, neighboring segments are not necessarily processed independently. Each detected dominant point is classified as being either a smooth or sharp dominant point. Neighboring segments partitioned by a sharp dominant point are processed independently of each other. Neighboring segments partitioned by a smooth dominant point are processed in a manner which imposes smoothness conditions thereupon. Two segments divided by a smooth dominant point encoded with curves share a same terminal point and a same terminal derivative in the vicinity of the smooth dominant point.

In one example embodiment, the present system and method includes performing the following. A plurality of dominant points are detected for a received character derived from a bitmap image. A dominant point is selected within the plurality of detected dominant points. An initial curve is fitted to a plurality of edge points in a vicinity of the selected dominant point. A set of boundary parameters in a vicinity of the selected dominant point are estimated based upon the initial curve. The selected dominant point is classified as being one of a sharp dominant point or a smooth dominant point. Definitions for smooth and sharp dominant point classification are provided herein in detail. A first curve is fitted between the selected smooth dominant point and a first dominant point. Fitting the first curve includes maintaining the boundary parameters established by the initial curve in the vicinity of the selected dominant point. A second curve is fitted between the selected smooth dominant point and a second dominant point. Fitting the second curve includes maintaining the boundary parameters established by the initial curve in the vicinity of the selected dominant point. In a manner more fully described herein, an output containing a vectorized representation of the character image is produced which is based upon the first curve and the second curves. Various embodiments have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for text vectorization with reduced artificial discontinuities of vectorized character representations derived from bitmap character images of scanned documents.

It should be understood that one of ordinary skill in this art should be readily familiar with the character image processing techniques employed herein, particularly those which directly relate to text recognition, coding of curves fitted to graphical pixels of bitmap characters, vectorized representations of text character images and text vectorization, and curve fitting to data points given end point boundary conditions. One of ordinary skill would also be knowledgeable about computer science, and software and hardware programming systems and methods sufficient to implement the functionality and capabilities described herein in their own document system environments without undue experimentation.

Definitions

An "image", as used herein, refers to a pattern of physical light comprised of known colors of the light spectrum which are visible by the human eye. When reduced to print, the image generally comprises a plurality of colored pixels arrayed on a media substrate or display device. A bitmap image (or image print) would be a photograph, plot, chart, and the like, as are generally known. When an image is rendered to a memory or storage, the values of the color pixels are generally stored in any of a variety of formats such as BMP, JPEG, GIF, TIFF, or other formats employed for storing image data on a storage media.

A "bitmap" or (raster graphics image) is a data structure representing a generally rectangular grid of pixels or points of color values. Raster images are stored in image files using a defined format. A bitmap of an image corresponds bit-for-bit with the original image, generally in a same format used in the display's video memory, or maybe as a device-independent bitmap. The bitmap is characterized by the width and height (X and Y dimensions) of the image in pixels and by the number of bits-per-pixel (a color depth, which determines the number of colors it can represent).

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

A "character image" refers to a text character of a bitmap image that has pixels of a different color than a background color upon which the text resides. Character images of text detected within a bitmap image can be vectorized to produce a vector representation that is resolution independent.

A "Dominant Point" of a character image refers to a point that divides the character outline into segments where each segment is able to be defined by a curve. Although dominant points separate corners and sharp transitions within a character outline, some dominant points partition smooth curves. As used herein, a dominant point is considered to be "smooth", as defined below, if and only if both the fitting error and the curvature are below pre-defined thresholds.

A "Smooth Dominant Point" refers to a dominant point separating segments of a character having a smooth transition there between. Smooth dominant points within a character image define character segments that are to be fitted with curves that maintain boundary parameters on both sides of the smooth dominant point.

A "Sharp Dominant Point" refers to dominant points that do not meet the requirements of a smooth dominant point. Sharp dominant points have a sharp transition between neighboring segments.

"Curve fitting" refers to processes that determine, for a given set of data, a set of curves that represent the given data.

"Text vectorization" is a method which determines a set of curves that defines the outlines of the character image. The present method expressly incorporates a commonly assigned text vectorization technique that prevents artificial between-segment jaggedness or discontinuity. U.S. patent application Ser. No. 12/332,913, entitled "*Text Vectorization Using OCR and Stroke Structure Modeling*", is incorporated herein in its entirety by reference.

An "image input device" is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). A signal of the scanned image data is produced by the scanning device. Such a digital signal contains information about pixels such as color value, intensity, and their location within the scanned image.

An "image output device" is any device capable of rendering the image. The set of image output devices includes digital document reproduction equipment and other xerographic copier systems as are widely known in commerce, photographic production and reproduction equipment, monitors and other displays, computer workstations and servers, including a wide variety of color marking devices, and the like.

One Example Embodiment

Figure 1:
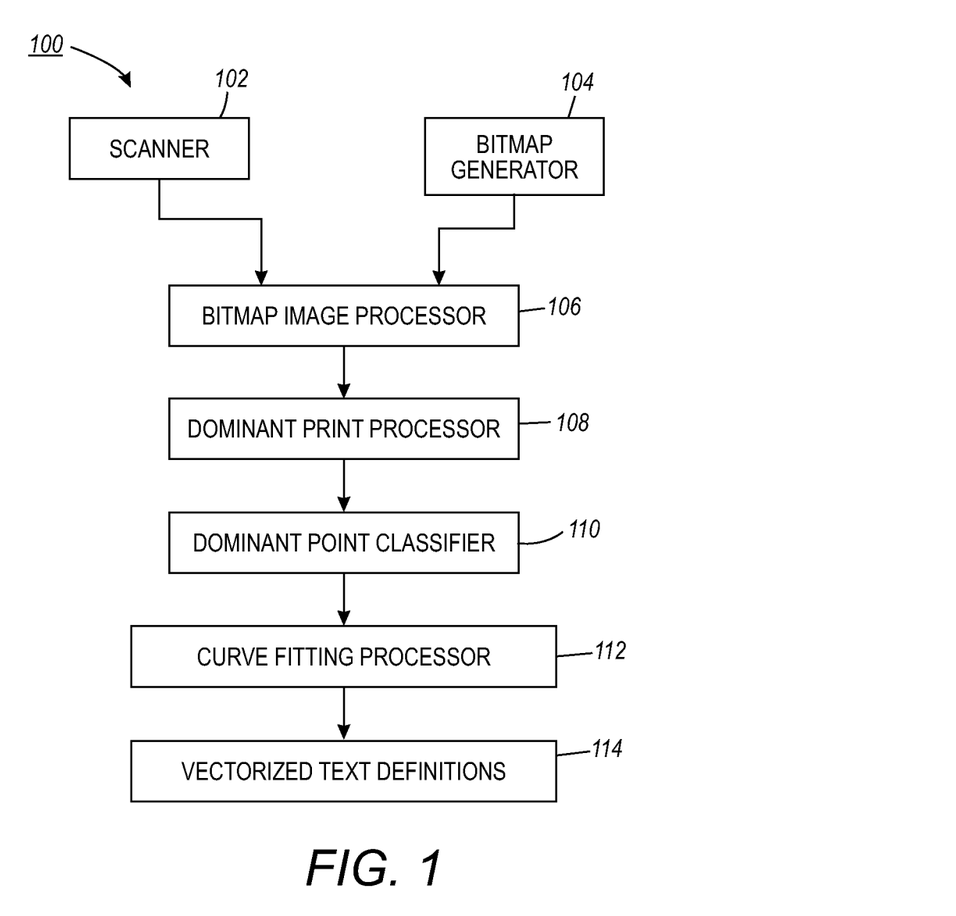
FIG. 1 illustrates a block diagram of an example processing system implementing one embodiment of the present method.

Reference is now made to FIG. 1 which illustrates a block diagram of an example processing system implementing one embodiment of the present method.

Processing system 100 includes bitmap image processor 106 that receives and processes bitmap images that include text characters. In one embodiment, the bitmap image processor identifies bitmapped character images within the received bitmap images. Bitmap images received by the bitmap image processor are produced, in one embodiment, by scanner 102 that scans printed documents to produce bitmap images in a manner well established in the arts. One embodiment further includes bitmap generator 104. Examples of bitmap generators include software processing that produces bitmap images, such as graphical software and the like.

Bitmap character images identified by the bitmap image processor are processed, in one embodiment, by dominant point processor 108. The dominant point processor is able to include, for example, image processing software that identifies dominant points within the character images. In further embodiments, the dominant point processor incorporates various aspects of Optical Character Recognition (OCR) software readily available in commerce. Such OCR systems have software and hardware constructs that identify a given character by associated it with various characteristics of recognized character images.

The dominant points identified by the dominant point processor 108 are processed by a dominant point classifier 110 to classify the dominant points as either "smooth," or "sharp." In one embodiment, image data detected in the vicinity of dominant points is processed to characterize the dominant point as either "smooth," or "sharp," as is described in further detail below.

In one alternative embodiment, the dominant point processor utilizes the recognition results generated by the OCR software described above. A set of rules are set for each recognized characters that describe each dominant point.

Such rules specify how the dominant point should be located. It also specifies whether a dominant point is classified as either smooth or sharp using, for instance, a glyph typography, and other information such as direction and location.

The processing system of FIG. 1 further includes curve fitting processor 112 that fits curves to the edge points between dominant points of a character image. In the following description, edge points of a character bitmap image are pixels that lie on an edge of the character formed within the character bitmap image. The curve generator produces curves that are used to define the vector representation for the character image.

The curve fitting processor 112 performs special processing to fit curves to bitmap character segments that start and/or end at a dominant point of the character image that are defined as "smooth." As previously stated, smooth dominant points within a character image define character segments that are to be fitted with curves that maintain boundary parameters on both sides of the smooth dominant point.

The processing system of FIG. 1 additionally includes vectorized text definitions 114 which include the vectorized representation of characters identified within the received bitmap images.

It should be appreciated that the processing system of FIG. 1 can be incorporated, either in whole or in part, in a special purpose computer processor that can be implemented as a separate computer system, an electronic circuit, or an ASIC, for example. The nature of the implementation will depend on the tech character processing environment wherein the present method finds its intended uses.

Example Flow Diagram

Figure 2:
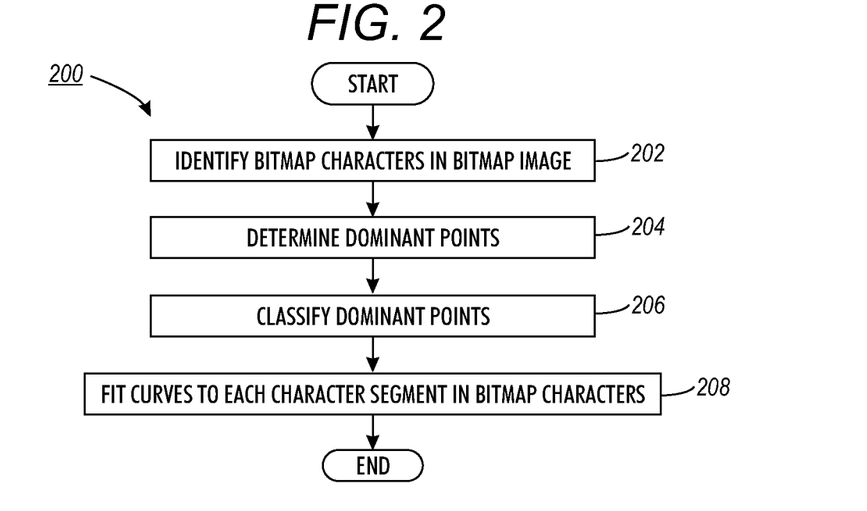
FIG. 2 illustrates one example embodiment of the present text smoothing method.

Reference is made to the flow diagram of FIG. 2 which illustrates one example embodiment of the present text smoothing method.

The example embodiment of the present vector text smoothing method begins, at 202, by first identifying text character images within a received bitmap image of a document. The bitmap image is a received, in one embodiment, using an image input device, as described above. In one embodiment, bitmap images are processed by the bitmap image processor 106 of FIG. 1.

At 204, the identified bitmap character images are processed to determine dominant points within the bitmap image. In one embodiment, bitmap images are processed by the dominant point processor 108 of FIG. 1. Additional embodiments utilize an optical character recognition process to identify dominant points within bitmap characters, as is described above.

At 206, dominant points are classified as either "smooth" or "sharp" according to the processing described in more detail below. One example embodiment includes an optical character recognition process. The recognition results are further used to specify each dominant point as either "smooth" or "sharp," as is described above. Further embodiments perform additional processing of the bitmap character image to determine if dominant points are "smooth," or "sharp," as is described below.

At 208, a curve is fit, as is described in more detail below, to each character outline segment in the identified bitmap character.

Figure 3:
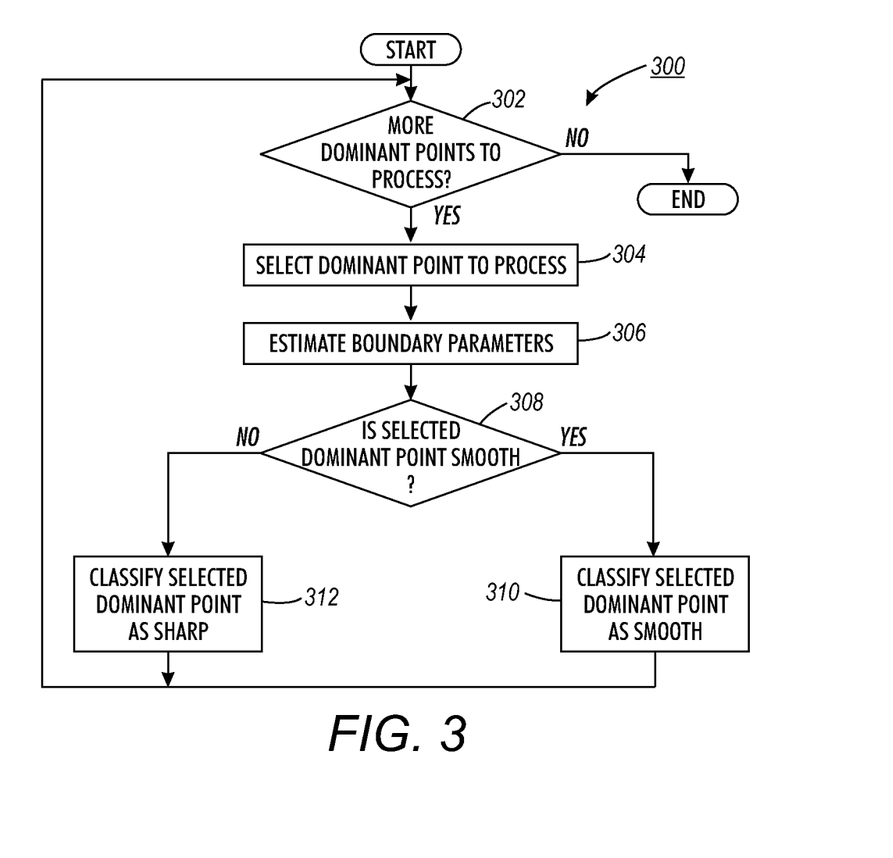
FIG. 3 illustrates an example of classifying dominant points processing as is performed in the example shown in FIG. 2.

Reference is now made to FIG. 3, which illustrates an example of classifying dominant points processing as is performed in at 206 in FIG. 2, above. The example of classifying dominant points illustrated in FIG. 3 is performed, for example, by an embodiment of the present method that does not include an optical character recognition process that characterizes dominant points as "smooth" or "sharp" as part of the optical character recognition process.

At 302, a determination is made if more dominant points are to be processed. Dominant points were determined at 204 of FIG. 2, as is described above.

At 304, a dominant point within the determined dominant point is selected for processing.

At 306, boundary parameters are estimated at the selected dominant point. In one embodiment, boundary conditions are estimated by fitting a curve to the character segments in the vicinity of the selected boundary point. Examples of estimated boundary parameters include a boundary point on the fitted curve that is associated with the dominant point, as defined below, and the derivatives of the curve near the dominant point.

At 308, the selected dominant point is determined to be either "smooth" or "sharp." In one embodiment, the determination includes characterization of the dominant point as "smooth" or "sharp" based on slope continuity on both sides of the dominant point.

One embodiment of the present method combines characterizing dominant points as "smooth" or "sharp," as in step 308, and estimating boundary conditions at the smooth dominant points, as in step 306. Specifically, for each dominant point, a small set of edge pixels are identified around each of the dominant points such that the small set of edge pixels cover both sides of that dominant point. One example of this combined processing picks, as a small set of edge pixels such as 10 pixels, or 0.5 times a segment's length if the segment length is less than 20 pixels, that cover both sides of the selected dominant point and that are closest to the selected boundary point. A parametric curve, such as a cubic Bezier curve as described below, is fitted to the small set of edge pixels that cover both sides of the selected dominant point. In one example, the processing selects for the selected dominant point, identified below as $(x^*,y^*)$, a point identified below as $(u,v)$ that is closest to the selected dominant point and that is on the curve fitted to the small set of edge pixels. The identified point $(u,v)$ is referred to herein as a "boundary point" and is selected such that:

$$u=Bx(t'), \text{ and } v=By(t'), \qquad (1)$$

where $t'=\arg \max_t [Bx(t)-x^*]^2+[Bx(t)-y^*]^2$. The derivative at the identified point $(u,v)$ of the fitted curve is referred to herein as the boundary derivative. The fitting error and the curvature at the boundary point of the curve fitted to the small set of edge pixels are good indicators for the sharpness of the transition. Consequently, this fitting error and the curvature are able to be used to classify the dominant point as either "smooth" or "sharp."

If the selected dominant point is determined, at 308, to not be "smooth," at 312 the selected dominant point is classified as "sharp." If the selected dominant point is determined to be "smooth," at 310 the selected dominant point is classified as "smooth." The processing then returns to determine, at 302, if there are more dominant points to process. If there are more dominant points to process, the processing continues as described above. If there are no more dominant points to process, the processing ends.

Figure 4:
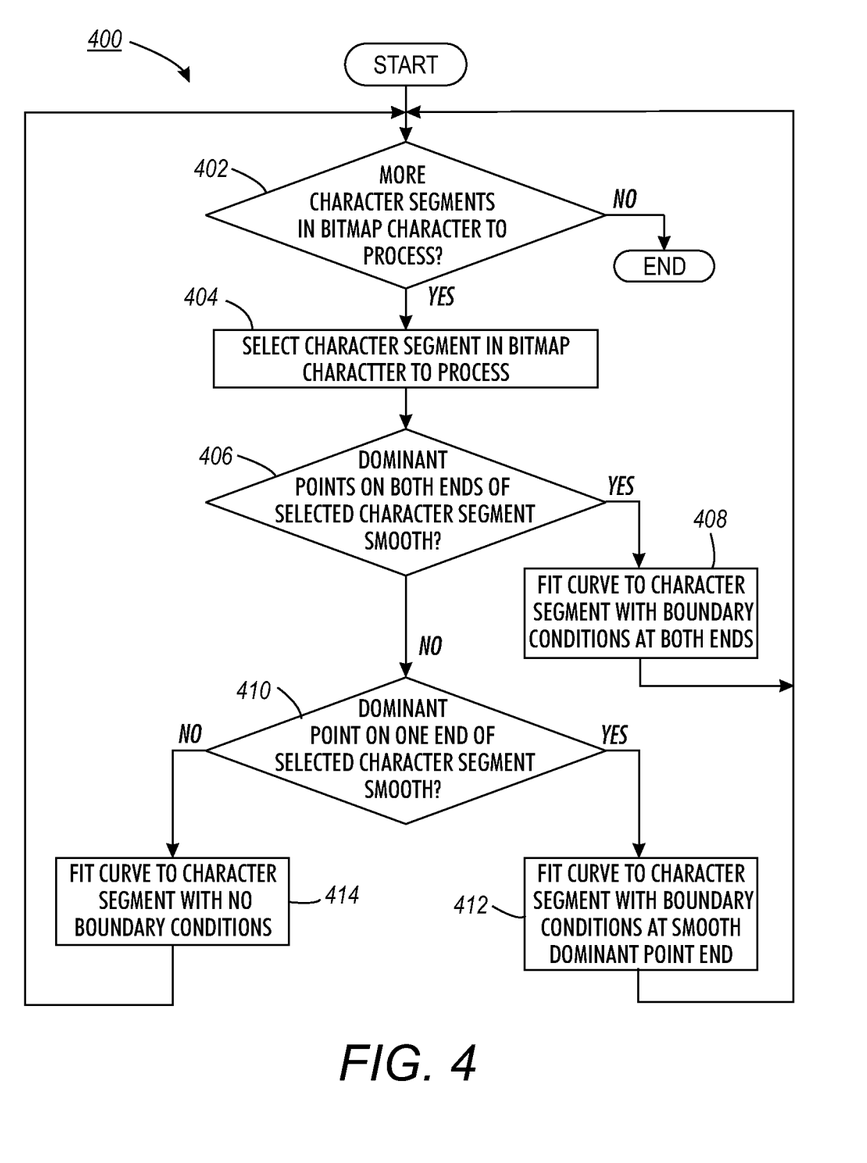
FIG. 4 illustrates an example curve fitting to character segments method as is performed in the example shown in FIG. 2.

Reference is now made to FIG. 4, which illustrates an example curve fitting to character segments method, as is performed at 208 in FIG. 2 described above.

At 402, a determination is made if there are more character segments to process within the identified bitmap characters of the bitmap image. If there are more character segments to process, at 404 a character segment in the bit map character is selected to be processed.

At 406, a determination is made if the dominant points on both ends of the selected character segment are smooth. If the dominant points on both ends of the selected character segment are smooth, at 408 a curve is fit with boundary conditions maintained at both ends of the curve The fitting of a curve to each segment of the bitmap character image operates to vectorize the character. The set of curves fitted to the character segments is generally determined by data fitting of a curve to the bitmap pixels of a character image to determine a best fit curve for the segment. Such methods are known in this art. One commonly used curve fitting method used for text vectorization is the cubic Bezier curve defined as:

$$Bx(t)=(1-t)^3 x_0 + 3t(1-t)^2 x_1 + 3t^2(1-t)x_2 + t^3 x_3 \quad (2)$$

$$By(t)=(1-t)^3 y_0 + 3t(1-t)^2 y_1 + 3t^2(1-t)y_2 + t^3 y_3, \ t \in [0, 1] \quad (3)$$

In the above Bezier curve definition, data fitting for text vectorization estimates values for the parameters $x_0$, $x_1$, $x_2$, $x_3$, $y_0$, $y_1$, $y_2$, and $y_3$ that are used in the above equations for each curve representing a segment of a character image.

In one embodiment, the processing maintaining boundary conditions on one or both ends of a curve includes ensuring the curve has an endpoint equal to the boundary point associated with a smooth dominant point near that end of the curve, and that the derivatives of curve near the smooth dominant point equals the boundary derivative at that boundary point, as defined above.

Expressed mathematically, for a boundary point, $(u_0, v_0)$, associated with a selected smooth dominant point, the processing applies the following constraints to the cubic Bezier curves fitted to the edge pixels of the character segments on either side of the selected smooth dominant point:

$$x_0 = u_0, \ y_0 = v_0, \text{ and } (y_1 - y_0)/(x_1 - x_0) = d_0 \quad (4)$$

where $(x_1, y_1)$ is a point on the fitted curve near the boundary point.

In a case where a particular character segment has "smooth" dominant points on both ends, similar constraints are also applied to the opposite end of the curve fitted to that character segment. For example, where the opposite end of a character segment is defined by a second selected smooth dominant point with an associated boundary point of $(u_1, v_1)$ and with a boundary derivative of $d_1$ and $$x_3 = u_1, \ y_3 = v_1, \text{ and } (y_2 - y_3)/(x_2 - x_3) = d_1 \quad (5)$$

where $(x_3, y_3)$ is a point on the fitted curve near the second selected boundary point.

If the selected segment was determined to not have smooth dominant points at both ends, at 410, a determination is made if a dominant point on only one end of the selected character segment is smooth. If the dominant point on only one end of the selected character segment is smooth, at 412 a curve is fit with boundary conditions maintained at the end of the curve with the smooth dominant point.

If the selected character segment was determined to not have a smooth dominant point at only one end, at 414 a curve is fit to the bitmap segment with no boundary conditions imposed on either end of the curve.

The processing then returns to determining, at 402, if there are more character segments in the bitmap character to process. If it is determined that there are more character segments to process, the processing continues as described above. If it is determined that there are no more character segments to process, the processing ends.

Various Embodiments

Figure 5:
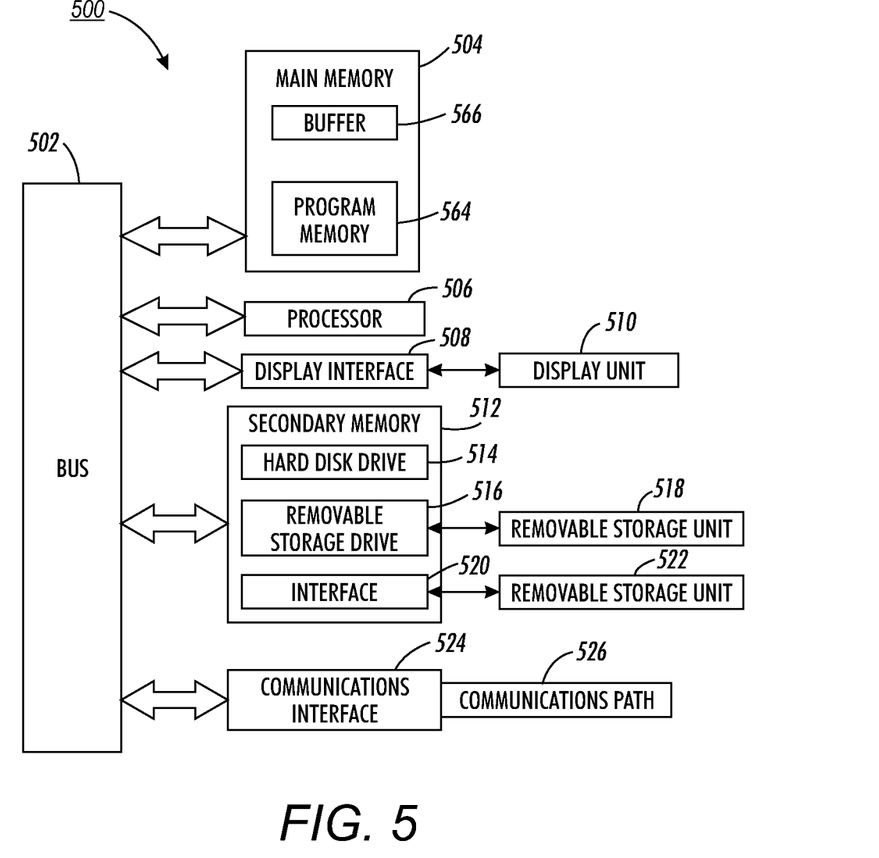
FIG. 5 illustrates a block diagram of one example embodiment of a special purpose computer useful for implementing one or more aspects of the present method.

Reference is now made to FIG. 5 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described in FIG. 1 and the flow diagrams of FIGS. 2 through 5.

Special purpose computer system 500 includes processor 506 for executing machine executable program instructions for carrying out all or some of the present method. The processor is in communication with bus 502. The system includes main memory 504 for storing machine readable instructions. Main memory may comprise random access memory (RAM) to support reprogramming and flexible data storage. Buffer 566 stores data addressable by the processor. Program memory 564 stores machine readable instructions for performing the present method. A display interface 508 forwards data from bus 502 to display 510. Secondary memory 512 includes a hard disk 514 and storage device 516 capable of reading/writing to removable storage unit 518, such as a floppy disk, magnetic tape, optical disk, etc. Secondary memory 512 may further include other mechanisms for allowing programs and/or machine executable instructions to be loaded onto the processor. Such mechanisms may include, for example, a storage unit 522 adapted to exchange data through interface 520 which enables the transfer of software and data. The system includes a communications interface 524 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 526 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for text vectorization, the method comprising:
receiving, from an image input device, a bitmap image of at least one document, said bitmap image having at least one character image; and
a processor executing machine readable program instructions for performing:
detecting, for said character image, a plurality of dominant points;
selecting a selected dominant point from said plurality of dominant points;
identifying a first dominant point and a second dominant point from said plurality of dominant points, said first dominant point and said second dominant points being different than said selected dominant point and further being located on opposite sides of said selected dominant point from one another;
fitting an initial curve to a plurality of edge points in a vicinity of said selected dominant point, said plurality of edge points lying along a boundary edge of said character image, said initial curve comprising a first curve portion extending on a first side of said selected dominant point and further comprising a second curve portion extending on a second side of said selected dominant point, said first side and said second side being on an opposite side from one another of said selected dominant point;
estimating a set of boundary parameters in a vicinity of said selected dominant point based upon said initial curve, said set of boundary parameters comprising a derivative of said first curve portion of said initial curve in said vicinity of said selected dominant point, and a derivative of said second curve portion of said initial curve in said vicinity of said selected dominant point;
classifying said selected dominant point as being one of a sharp dominant point and a smooth dominant point, said smooth dominant point separating character segments where said derivative of said first curve in said vicinity of said selected dominant point is substantially equal to said derivative of said second curve in said vicinity of said selected dominant point;
in response to said selected dominant point being classified as a smooth dominant point:
fitting a first curve between said selected dominant point and said first identified dominant point, said fitting maintaining, on said first curve, said derivative of said first curve portion of said initial curve in said vicinity of said selected dominant point; and
fitting a second curve between said selected dominant point and said second identified dominant point, said fitting maintaining, on said second curve portion, said derivative of said second curve portion of said initial curve in said vicinity of said selected dominant point are maintained, wherein said derivative of said first curve portion of said initial curve in said vicinity of said selected dominant point is substantially equal to said derivative of said second curve portion of said initial curve in said vicinity of said selected dominant point; and
outputting, to an image output device, a vectorized representation of said character image based upon said first and second curves.

2. The method of claim 1, wherein fitting said first curve and fitting said second curve further comprises maintaining boundary parameters established at a point on said initial curve that is closest to said selected dominant point.

3. The method of claim 1, wherein said set of boundary parameters further comprises boundary point locations and curve directions.

4. The method of claim 1, further comprising generating said bitmap image by scanning a document.

5. The method of claim 1, further comprising performing optical character recognition on said bitmap image to produce a recognized character, wherein detecting said plurality of dominant points comprises retrieving, from a storage associated with said optical character recognition, a plurality of dominant point definitions for said recognized character, wherein said storage further comprises a respective characterization of at least some dominant points within said plurality of dominant points as being smooth dominant points.

6. The method of claim 5, wherein classifying said selected dominant point comprises identifying said selected dominant point as being characterized as a smooth dominant point within said plurality of dominant point definitions, and wherein fitting a respective initial curve and estimating said set of boundary parameters are performed after the retrieving and in response to classifying said selected dominant point as a smooth dominant point.

7. The method of claim 1, further comprising, in response to said selected dominant point being classified as a sharp dominant point:
fitting a first curve between said selected dominant point and said first identified dominant point, said fitting maintaining, on said first curve, said derivative of said first curve portion of said initial curve in said vicinity of said selected dominant point; and
fitting a second curve between said selected dominant point and said second identified dominant point, said fitting imposing no boundary condition at said selected dominant point.

8. A system for text vectorization, the system comprising:
a memory;
a storage medium for storing data; and
a processor in communication with said storage medium and said memory, said processor executing machine readable instructions for performing the method of:

receiving, from an image input device, a bitmap image of at least one document, said bitmap image having at least one character image;

detecting, for said character image, a plurality of dominant points;

selecting a dominant point from said plurality of dominant points;

identifying a first and second dominant point from said plurality of dominant points, said first and second dominant points being different than said selected dominant point and further being located on opposite sides of said selected dominant point from one another;

fitting an initial curve to a plurality of edge points in a vicinity of said selected dominant point, said plurality of edge points lying along a boundary edge of said character image, said initial curve comprising a first curve portion extending on a first side of said selected dominant point and further comprising a second curve portion extending on a second side of said selected dominant point, said first side and said second side being on an opposite side from one another of said selected dominant point;

estimating a set of boundary parameters in a vicinity of said selected dominant point based upon said initial curve, said set of boundary parameters comprising a derivative of said first curve portion of said initial curve in said vicinity of said selected dominant point, and a derivative of said second curve portion of said initial curve in said vicinity of said selected dominant point;

classifying said selected dominant point as being one of a sharp dominant point and a smooth dominant point, said smooth dominant point separating character segments where said derivative of said first curve in said vicinity of said selected dominant point is substantially equal to said derivative of said second curve in said vicinity of said selected dominant point;

in response to said selected dominant point being classified as a smooth dominant point:
  fitting a first curve between said selected dominant point and said first identified dominant point, said fitting maintaining, on said first curve, said derivative of said first curve portion of said initial curve in said vicinity of said selected dominant point; and
  fitting a second curve between said selected dominant point and said second identified dominant point, said fitting maintaining, on said second curve portion, said derivative of said second curve portion of said initial curve in said vicinity of said selected dominant point are maintained, wherein said derivative of said first curve portion of said initial curve in said vicinity of said selected dominant point is substantially equal to said derivative of said second curve portion of said initial curve in said vicinity of said selected dominant point; and outputting, to an image output device, a vectorized representation of said character image based upon said first and said second curves.

9. The system of claim 8, wherein fitting said first curve and fitting said second curve further comprises maintaining boundary parameters established at a point on said initial curve that is closest to said selected dominant point.

10. The system of claim 8, wherein said set of boundary parameters comprises boundary point locations and curve directions.

11. The system of claim 8, further comprising generating said bitmap image by scanning a document.

12. The system of claim 8, further comprising performing optical character recognition on said bitmap image to produce a recognized character, wherein detecting said plurality of dominant points comprises retrieving, from a storage associated with said optical character recognition, a plurality of dominant point definitions for said recognized character, wherein said storage further comprises a respective characterization of at least some dominant points within said plurality of dominant points as being smooth dominant points.

13. The system of claim 12, wherein classifying said selected dominant point comprises identifying said selected dominant point as being characterized as a smooth dominant point within said plurality of dominant point definitions, and wherein fitting a respective initial curve and estimating said set of boundary parameters are performed after retrieving and in response to classifying said selected dominant point as a smooth dominant point.

14. The system of claim 8, the method further comprising, in response to said selected dominant point being classified as a sharp dominant point:
  fitting a first curve between said selected dominant point and said first identified dominant point, said fitting maintaining, on said first curve, said derivative of said first curve portion of said initial curve in said vicinity of said selected dominant point; and
  fitting a second curve between said selected dominant point and said second identified dominant point, said fitting imposing no boundary condition at said selected dominant point.

* * * * *